US008543167B2

(12) United States Patent
Harrysson et al.

(10) Patent No.: US 8,543,167 B2
(45) Date of Patent: Sep. 24, 2013

(54) DISPLAY ARRANGEMENT

(75) Inventors: Fredrik Harrysson, Göteborg (SE); Jonas Medbo, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 142 days.

(21) Appl. No.: 12/746,308

(22) PCT Filed: Dec. 6, 2007

(86) PCT No.: PCT/EP2007/063400
§ 371 (c)(1), (2), (4) Date: Jun. 4, 2010

(87) PCT Pub. No.: WO2009/071124
PCT Pub. Date: Jun. 11, 2009

(65) Prior Publication Data

US 2010/0261445 A1 Oct. 14, 2010

(51) Int. Cl.
*H04B 1/38* (2006.01)
*H04M 1/00* (2006.01)

(52) U.S. Cl.
USPC .................... 455/566; 455/575.1; 455/575.7; 343/873

(58) Field of Classification Search
USPC .................... 455/566, 575.1, 575.7; 343/873
See application file for complete search history.

(56) References Cited

U.S. PATENT DOCUMENTS

| | | | | |
|---|---|---|---|---|
| 6,774,847 | B1 * | 8/2004 | Epstein et al. | 343/873 |
| 6,825,811 | B2 * | 11/2004 | Iwai et al. | 343/702 |
| 2002/0140608 | A1 * | 10/2002 | Zaghloul et al. | 343/700 MS |
| 2003/0197648 | A1 * | 10/2003 | Quinn et al. | 343/873 |
| 2005/0174290 | A1 * | 8/2005 | Huang | 455/566 |
| 2006/0022880 | A1 | 2/2006 | Chiang | |
| 2006/0033863 | A1 | 2/2006 | Lan et al. | |
| 2008/0052419 | A1 * | 2/2008 | Oda et al. | 710/7 |
| 2009/0051620 | A1 * | 2/2009 | Ishibashi et al. | 343/897 |

FOREIGN PATENT DOCUMENTS

| | | | |
|---|---|---|---|
| JP | 05-110331 | A | 4/1993 |
| JP | 2000-138512 | A | 5/2000 |
| JP | 2007-251550 | A | 9/2007 |
| WO | WO 01/99231 | A | 12/2001 |
| WO | WO 2006/106759 | A | 10/2006 |
| WO | WO 2006/106982 | A | 10/2006 |

* cited by examiner

*Primary Examiner* — Wen Huang

(57) ABSTRACT

The present invention relates to a display arrangement comprising a display means and receiving and/or transmitting means adapted to be arranged in association with said display means. An optically transparent and electrically conductive layer structure is adapted to be provided on the display means. Said optically transparent and electrically conductive layer structure is arranged or structured to form a plurality of receiving and/or transmitting elements constituting said receiving and/or transmitting means. Feeding and/or controlling means are provided to individually or groupwise feed and/or control said receiving and/or transmitting elements.

19 Claims, 4 Drawing Sheets

DISPLAY ARRANGEMENT

TECHNICAL FIELD

The present invention relates to a display arrangement comprising a display means in association with which receiving and/or transmitting means are provided, e.g. antenna means.

BACKGROUND

If a display is somehow combined with a receiving and/or transmitting means, such as for example antenna means, the latter are provided at the back of the display screen or in the frame of the display. It is however highly important how an antenna arrangement is implemented or constructed, for example both as far as data transmission capacity of a full radio network as well as on single links are concerned. In order to exploit the potential capacity of a terminal antenna as much as possible, the terminal may be equipped with multiple antennas which couple independently to different degrees of freedom of a radio channel in a wireless communication network. For a single wave, the degrees of freedom are basically the direction and the polarization. In a real channel, however, a transmitted wave is scattered by physical objects in the surrounding environment which results in a so called multi-path channel. This means that there are many different pathways corresponding to different directions, at the receiver as well as at the transmitter. On e.g. a laptop, it is most natural to utilize the surrounding frame for antenna element positioning, or the back of the screen as mentioned above. A main disadvantage with utilizing the back of the screen of a laptop for an antenna arrangement is that the antenna elements will be screened by the display means in the opposite, front, direction. The radio paths having the best gain are typically concentrated in a limited range of angle. If the back of the laptop screen is directed away from this range, the strongest paths will be strongly attenuated. In one attempt to overcome this disadvantage antennas have been placed at the edge or frame of the laptop cover. This however restricts or limits the size, number and physical arrangement of antenna elements. For all known antenna arrangements, for example associated with laptop displays, screening and attenuation of strong paths constitute serious problems. Moreover it is disadvantageous that it is not possible to an efficient extent control the provision of coverage for all directions. Particularly, in future wireless communication systems, multiple antennas or antenna arrays used either for diversity, beam forming gain or spatial multiplexing (MIMO) will be highly important components. It is then a disadvantage that known antenna arrangements are not large or flexible enough. Particularly antennas used for laptops, palmtops and similar devices cannot be built to support such functionalities. There is normally a lack of space on such devices which have a tendency of becoming more attractive the smaller they are. To summarize, it is not possible to provide satisfactory antenna characteristics for antennas located at the back of a display or in the frame of a display since they suffer from being small size, restricted in placement and/or screened hence impairing reception and transmission capability and quality, or optical representation capability. It has so far been of utmost importance to make sure that a display and its optical representation capabilities are not impaired by the antenna, and that the antenna is not impaired by the display. But known solutions suffer from the disadvantage that at least the antennas cannot be made and arranged in such a manner that their functioning will be efficient, flexible and offer satisfactory characteristics as far as reception and transmission is concerned.

SUMMARY

It is an object of the present invention to provide a display arrangement associated with an antenna means where both the antenna and the display are well functioning and flexible. Particularly it is an object to provide an arrangement which comprises display means associated with an antenna means through which attenuation of strong paths does not constitute a problem and through which the radio paths having the highest gain can be used. It is also an object to provide an arrangement which allows for full exploitation of the potential capacity, and which allows independent coupling to different degrees of freedom of, a radio channel. Particularly it is an object to provide a combined display and antenna arrangement which is efficient and which can handle many different pathways corresponding to different directions at receiver and transmitter.

Even more particularly it is an object to provide a flexible and controllable display and antenna arrangement that can be used in wireless communication devices such as laptops, palmtops, mobile phones. It is also an object to provide a display arrangement with antenna means which is cheap and easy to fabricate and wherein the antenna part can be made large enough without requiring extra space and which allows transmission/reception on all possible directions. Particularly it is an object to provide a display antenna arrangement wherein neither the antenna nor the display suffers from screening problematics by the other and which is appropriate for multi-path radio- or millimeter waves signals or microwave signals. It is also an object to provide an arrangement which is suitable for wireless multimedia equipment for radio frequency communication. Moreover it is an object to provide an arrangement which has excellent receiving and transmitting capabilities and properties and in addition thereto, has a high qualitative optical representation capability.

Therefore a display arrangement is provided which comprises a display means and receiving and/or transmitting means adapted to be arranged in association with said display means. An optically transparent and electrically conductive layer structure is provided on the display means. The optically transparent and electrically conductive layer structure is arranged or structured to, if needed in combination with a grounding layer, form a plurality of receiving and/or transmitting elements constituting said receiving and/or transmitting means. Feeding and/or controlling means are provided to individually or groupwise feed and/or control said receiving and/or transmitting elements.

It is extremely favourable that advantage can be taken of substantially the whole display surface of a display screen. (for example of a wireless communication terminal such as a laptop computer or a palmtop or a mobile telephone etc.) for receiving and/or transmitting purposes as well. It is also an advantage that screening of antenna elements by optical representation means and vice versa is avoided.

It is also an advantage that effective antenna arrangements with antenna arrays can be provided, for example for future advanced wireless communication systems. Another advantage is that data transmission capacity of a radio network or a single link can be improved and that the potential available capacity can be exploited since it is possible to equip a terminal device with multiple antennas which couple independently to different degrees of freedom of a radio channel.

It is particularly an advantage that an antenna arrangement supporting multi-path reception/transmission is provided which can be fed and/or controlled or processed in a most flexible and easy manner. It is also an advantage that, on a wireless communication device, a multiple antenna arrangement can be provided which has antenna diversity, which allows beam forming gain and spatial multiplexing.

BRIEF DESCRIPTION OF THE DRAWINGS

The invention will in the following be more thoroughly described, in a non-limiting manner, and with reference to the accompanying drawings, in which.

DETAILED DESCRIPTION

Figure 1:
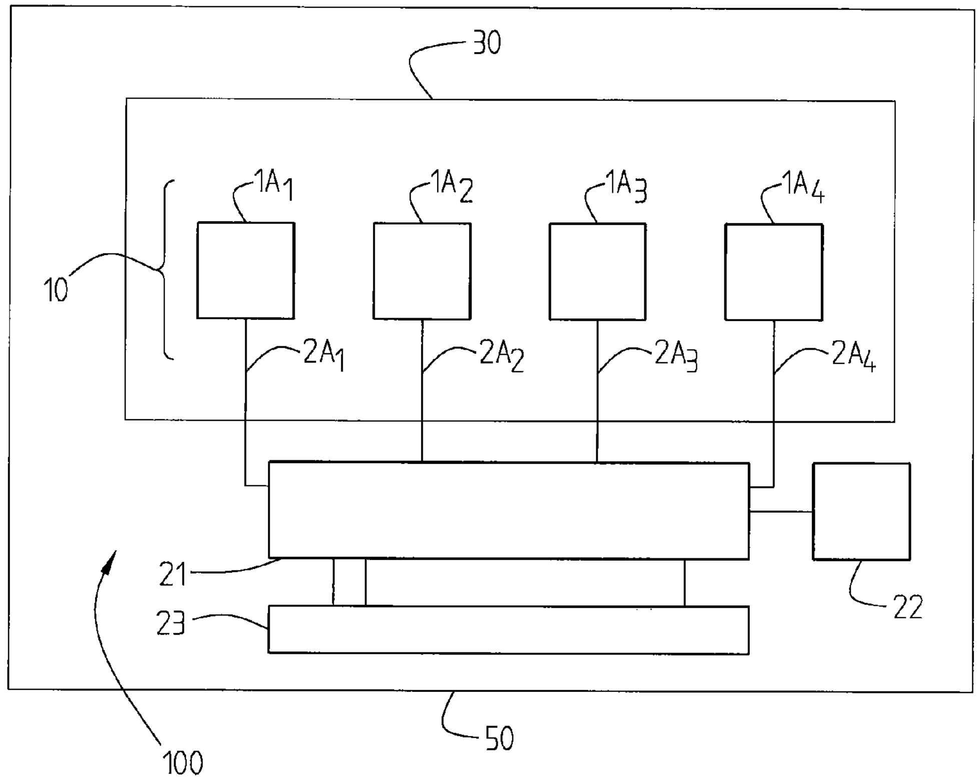
FIG. 1 is a block diagram of a first embodiment of a display arrangement with receiving and/or transmitting elements.

FIG. 1 shows an implementation of a combined display and antenna arrangement 100 with receiving and transmitting elements acting as an antenna means 10 comprising a number of antenna elements $\mathbf{1A}_1$, $\mathbf{1A}_2$, $\mathbf{1A}_3$, $\mathbf{1A}_4$. The antenna means 10 are provided by means of an optically transparent and electrically conductive layer structure which is provided in front of, i.e. on top of, a display means 30 (display screen) of for example a laptop 50 or similar. The antenna elements $\mathbf{1A}_1, \ldots, \mathbf{1A}_4$ (only a few shown in FIG. 1) here comprise array antenna elements. The optically transparent and electrically conductive layer comprises transmission lines $\mathbf{2A}_1$, $\mathbf{2A}_2$, $\mathbf{2A}_3$, $\mathbf{2A}_4$ for antenna feeding/controlling which connect to feeding and/or control means 21. A grounding layer (not shown) is included in the display means 30 or alternatively provided as a separate layer to which the antenna means are connected as will be further illustrated below. The transmission lines $\mathbf{2A}_1$, $\mathbf{2A}_2$, $\mathbf{2A}_3$, $\mathbf{2A}_4$ are connected to feeding and/or controlling means which particularly comprise or are included in switching and/or combining means 21, e.g. comprising RF switching and combining circuits controlled by controlling means 22, here comprising a digital switching and combining control means. The antenna elements are via antenna ports through switching and/or combining means 21 connected to a so called RF radio chain. A RF/radio chain here means the electronics for e.g. down conversion (for reception) to intermediate frequencies, filtering, signal detection, separation between receive and transmit signals, analogue-to-digital conversion (for reception) (digital-to-analogue for transmission) etc.

In this embodiment the antenna elements comprise patches. The patches can be of any form and shape and be arranged in any appropriate manner, e.g. in one or more arrays.

Figure 2:
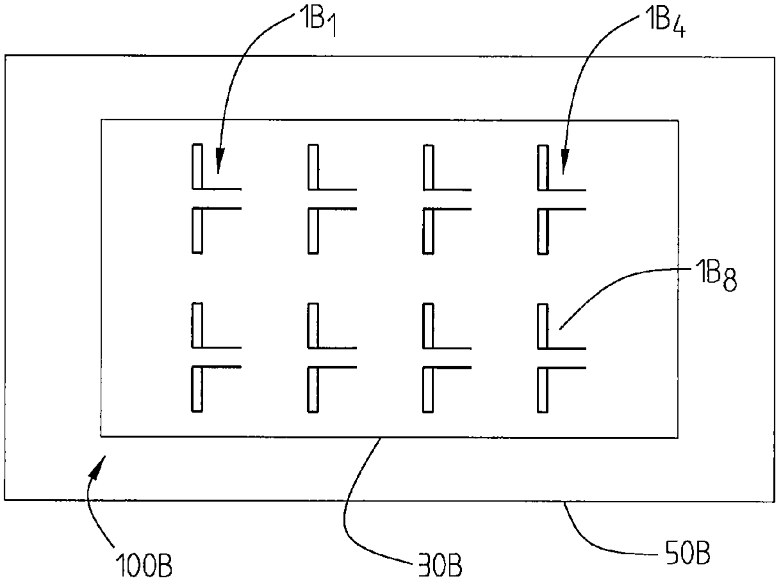
FIG. 2 is a block diagram of a second embodiment of a display arrangement with receiving and/or transmitting elements, FIG. 3 very schematically illustrates a laptop with a display means and antenna means according to the present invention.

FIG. 2 shows a particular example of an arrangement 100B wherein the antenna elements are dipole antennas. In this Figure only antenna elements $\mathbf{1B}_1$, $\mathbf{1B}_2, \ldots, \mathbf{1B}_8$ disposed on a display means 30B are illustrated. In other aspects the functioning is similar to that described with reference to FIG. 1. No ground plane for the antenna means is needed here since the antenna elements are dipoles. The antenna elements are arranged as coplanar antenna elements fed in the same plane. They may also be arranged in two or more planes or be fed in another plane as long as the feeding is balanced.

Figure 3:
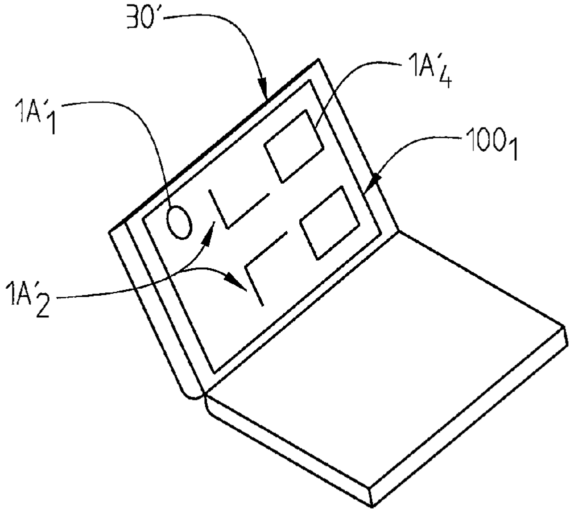

FIG. 3 shows one embodiment of an antenna arrangement $\mathbf{100}_1$ provided in association with a display screen 30' of a laptop. An optically transparent, electrically conductive layer forming antenna elements $\mathbf{1A}_1'$, $\mathbf{1A}_2'$, $\mathbf{1A}_3'$, $\mathbf{1A}_4'$ (here shown to be of different types merely to indicate that the inventive concept covers any type of antenna means) is placed in front of the screen. Basically the surface of the display screen 30' occupied on a laptop computer is used also for provisioning of the antenna means. The antenna elements of the optically transparent, electrically conductive layer can be realized in many different ways using known production techniques. Thin conducting wires or planar patches may be arranged to form several separate antenna elements. They may also be combined into arrays to form array antennas. As referred to above, in addition to the antenna elements, a feeding structure comprising transmission lines may be formed either by coaxial cables, thin wires, thin waveguides, for example stripline or micro-strip, and also be fitted into the structure. This is not shown in FIG. 3.

Figure 4:
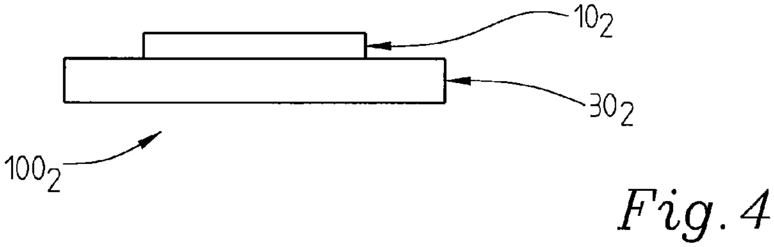
FIG. 4 is a schematic cross-sectional view of one implementation of a display and antenna arrangement.

FIG. 4 is a very schematical cross-sectional view of a display and antenna arrangement $\mathbf{100}_2$ showing the optically transparent electrically conductive (for RF or millimeter waves, or microwaves) layer $\mathbf{10}_2$ disposed on a display means $\mathbf{30}_2$. The display means $\mathbf{30}_2$ comprises a grounding conductive layer or functionality (not shown in the figure) and said grounding conductive layer is adapted to act as a ground plane also for the antenna means $\mathbf{10}_2$. It should be clear that even if the antenna means (preferably also feeding and/or controlling means, not shown) here are shown as being disposed directly on the display means $\mathbf{30}_2$, it may alternatively be provided on a support layer which is optically transparent but non-conducting (not shown). The main purpose of FIG. 4 is to indicate that no separate grounding layer is needed but the grounding properties of the display means can be used to form a ground plane for the antenna means.

According to the invention the optically transparent and electrically conductive layer structure comprises a thin optically transparent film which is conducting for RF or millimeter wave (or microwave) signals. The conductivity is provided by means of metal or a doped semi-conducting material. It is used to form antenna elements, or more generally receiving and/or transmitting means. Optionally also feeding and/or controlling means are incorporated in the optically transparent, electrically conductive layer structure.

In one implementation the optically transparent, electrically conductive material comprises a semi-conducting layer which is transparent for light but conducting for the intended frequency, e.g. RF and/or millimeter waves.

Figure 5:
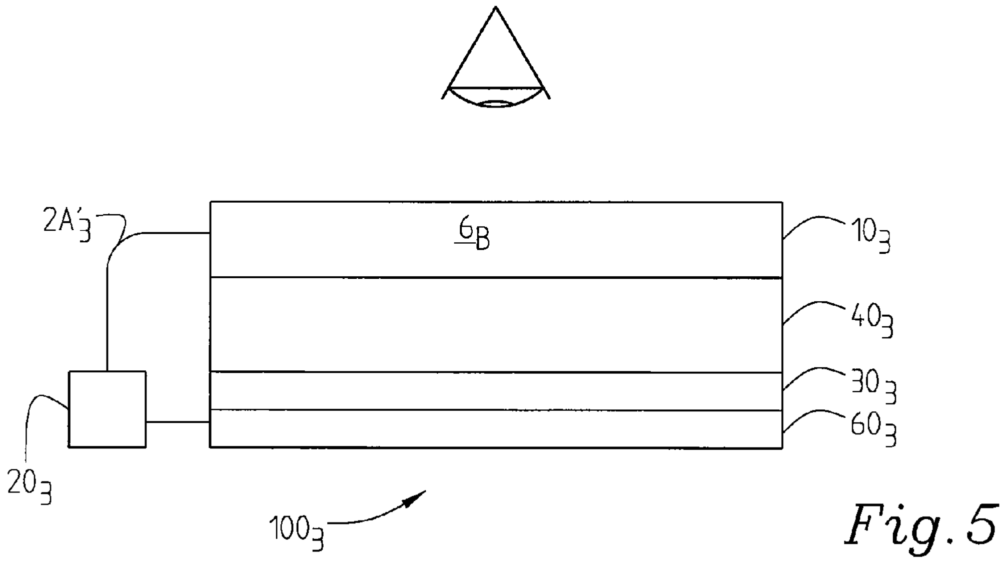
FIG. 5 is a cross-sectional view of another implementation of a display and antenna arrangement.

FIG. 5 schematically shows an alternative implementation of a display arrangement $\mathbf{100}_3$ in cross-section which comprises an optically transparent, electrically conductive layer $\mathbf{10}_3$ forming an antenna means and arranged on an optically transparent, non-conductive, support layer $\mathbf{40}_3$ disposed on display means $\mathbf{30}_3$. It is here supposed that a separate grounding conductive layer $\mathbf{60}_3$ is provided, e.g. on a second side of the displaying means which is opposite to the side, here called the first side, of the display means $\mathbf{30}_3$ on which the antenna means $\mathbf{10}_3$ is provided, the top or front of the screen. The grounding layer $\mathbf{60}_3$ is adapted to act as a ground plane of the antenna means. In this particular implementation it is also illustrated how a bonding wire $2A_3$' connects the antenna means of the antenna layer $\mathbf{10}_3$ with an RF connector $\mathbf{20}_3$ which in turn is connected to the separate conductive grounding layer $\mathbf{60}_3$ behind or at the bottom of the display. The ground plane functionality for the antenna means may also be provided by the grounding functionality of the display means itself. Whether the grounding functionality of the display means is used also for the antenna means depends on the display technology that is used. For exemplifying reasons some examples of displays will be discussed further below.

Optionally the feeding means referred to above, which are connected to and provided for feeding the antenna elements, are adapted to feed said antenna elements separately or groupwise. The feeding means are separate means or combined with, or form part of, the switching and/or combining means. Optionally the switching and/or combining means are integrated in a circuit board of the display means. The display means may be the display screen of a wireless communication device, particularly a wireless multimedia communication device, for example a laptop, a palmtop, a mobile telephone or similar. The switching and/or combining means are optionally provided in the circuit board of the wireless communication device, either in the display screen itself or in computer control means for controlling the display screen.

The transmitting and/or receiving elements may be separately transmitting and/or receiving elements, e.g. antenna elements or they may be combined into arrays. According to different embodiments the elements can be combined in different ways, be switchable to perform one or other function, or be arranged to form antenna arrays.

Feeding can be provided for in different manners. A few examples are given below in FIGS. 6-7.

Figure 6:
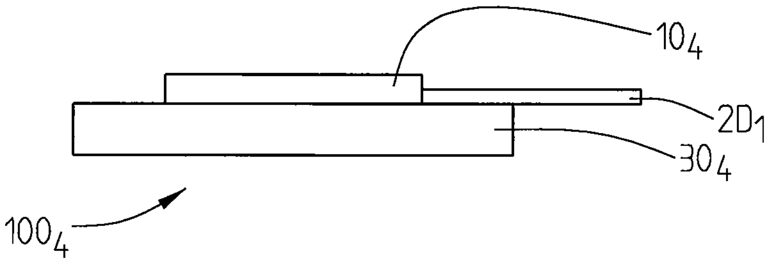
FIG. 6 is a cross-sectional view of still another embodiment of a display and antenna arrangement with feeding means according to a particular implementation.

FIG. 6 shows a simplified cross-sectional view of an antenna arrangement $\mathbf{100}_4$ which comprises an antenna means formed by means of an optically transparent and electrically conductive layer $\mathbf{10}_4$ disposed on a display means $\mathbf{30}_4$. Optionally a support layer as discussed above may be provided (not shown). Feeding means $2D_1$ are provided in the same plane as the antenna means $\mathbf{10}_4$ comprising a coplanar antenna. Each antenna element of the antenna means $\mathbf{10}_4$ (here shown as comprising only one element for reasons of simplicity) may be fed separately or a plurality of antenna elements may be fed groupwise.

Figure 7:
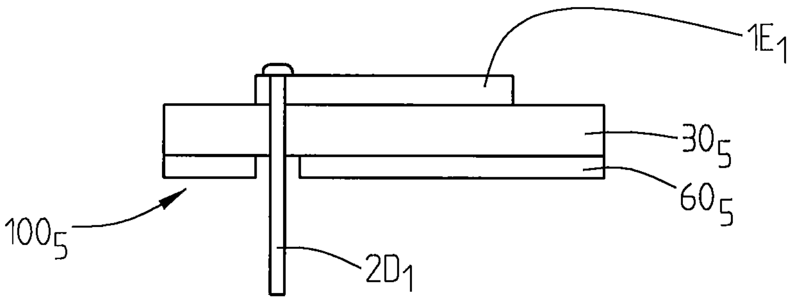
FIG. 7 is a cross-sectional view of an exemplary display and antenna arrangement with feeding means according to another implementation.

FIG. 7 shows a cross-sectional view of another antenna arrangement $\mathbf{100}_5$ wherein the antenna means comprises antenna patches $\mathbf{1}E_1$ (only one shown) disposed on the display means $\mathbf{30}_5$. A separate grounding layer $\mathbf{60}_5$ is provided. The transmission means here comprises a via $\mathbf{2}D_1$ through the display means $\mathbf{30}_5$ to the antenna patch $\mathbf{1}E_1$.

Figure 8:
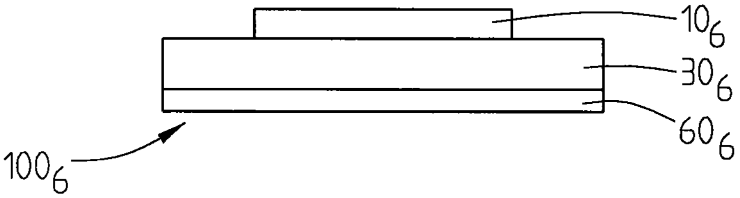
FIG. 8 is a cross-sectional view of an exemplary display and antenna arrangement with feeding means according to still another implementation.

FIG. 8 is a cross-sectional view of still another antenna arrangement $\mathbf{100}_6$ comprising an antenna patch $\mathbf{10}_6$ disposed on a display means $\mathbf{13}_6$ wherein the feeding can take place via slots, loops in layer $\mathbf{60}_6$ etc. Optionally several ground planes are provided with the use of several conducting planes. Feeding of the patch may be provided electromagnetically.

Optionally the sizes and/or the shapes of the antenna elements depend on the frequency and/or polarization properties of the communication channel over which radio- or millimeter waves is received/transmitted. The antenna elements in some advantageous implementations comprise patches. The thin optically transparent and electrically conductive layer can be provided using different techniques. It may be deposited, e.g. by vacuum deposition or sputtering onto a transparent non-conductive support layer together with transmission lines with antenna feeding onto the transparent non-conductive support layer, to form antenna elements, for example patches of any appropriate shape and number and in any configuration. If a support layer is used, said support layer is attached on top of the display means, for example a display of a laptop. Each antenna element or group of antenna elements is connected to a switching and/or combining device which optionally is integrated in a circuit board for example of the laptop, either in the display part or in the computer part by transmission lines, for example micro striplines, and an RF connector.

In the same embodiments the antenna elements support dual polarisations. In that case two transmission lines, or conducting lines, connect to each antenna element.

Different techniques can be used to impart electrical conductivity to an optical transparent layer or to an insulating layer which is optically transparent. In one embodiment a mesh structure is etched onto the optically transparent layer. If the line width is narrow enough, the mesh becomes invisible. If the amount of the surface covered by metal is small enough, most of the light will be transmitted. Several such layers may be used to form standard layered antenna arrays, i.e. sub-layers.

Another way to impart electrical conductivity to insulating (optically transparent) layers is to apply a thin metallic coating. The coating may consist of gold, silver, copper or similar. In still another embodiment a metal oxide coating is applied. The metal oxide coating may for example consist of $InSnO_2$. It is also possible to provide a layer comprising a conducting polymer or a similar material under a thin protective coating. Still further a hard coating can be filled with conducting powder of for example metal, carbon or a doped conducting polymer. Still further a doped polymer or carbon nano tube can be admixed to a coating at molecular level.

Vacuum deposited indium tin oxide (ITO) is a standard industrial material used to provide electrical conductivity to glass and polymeric films while still leaving them optically transparent.

In one embodiment the switching and/or combining means comprise or are connected to beam-forming means or MIMO (Multiple Input Multiple Output) spatial multiplexing means. This means for example that multiple antennas or antenna arrays, e.g. for future wireless communication systems, can be used for diversity, beam-forming gain or spatial multiplexing. Thus, it is a great advantage that through the present invention it becomes possible to select placement of and arrange antenna elements or arrays in any desired manner within a case of a terminal communication device, for example a multimedia device, to provide coverage of all possible RF reception/transmission directions. It is also an advantage that it becomes possible to boost transmission capacity. Since substantially the entire surface of a display, for example a laptop display can be used for the antenna arrangement, it becomes possible to provide more effective antenna arrays with high gain and omnidirectional properties, enabling beam-forming and MIMO spatial multiplexing in a terminal equipment, and the antennas can be adapted to the relevant applications and circumstances.

Figure 9:
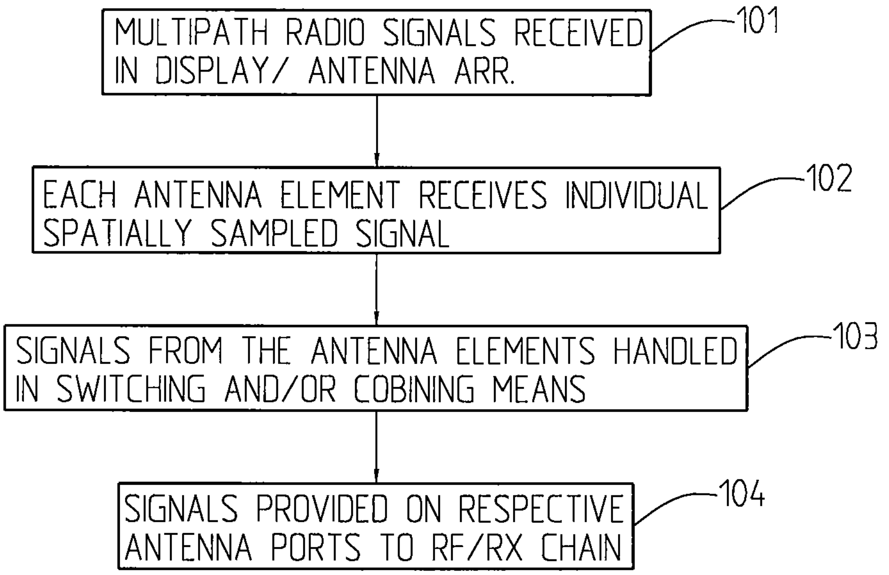
FIG. 9 is a schematical flow diagram describing one implementation of the inventive concept for receiving radio signals in the combined display and antenna arrangement.

FIG. 9 is a very schematical flow diagram illustrating multi-path radio signals received in antenna means, i.e.

incoming multi-path radio signals, 101. Each antenna element or group of antenna elements receives individual spatially sampled signals, 102, i.e. they are received at different locations, where the respective antenna elements are located. Then the signals from the antenna elements are handled in switching and/or combining means or a distribution network, 103, for example controlled by digital control circuits in antenna switching/combining/control means, e.g. a WLAN (Wireless Local Area Network) control means. The switching and/or combining network can be adapted to provide an improved radio signal (diversity), and/or spatially filtered signals (beam-forming) and/or spatially multiplexed multiple stream signals (MIMO), 103. The signals are here then provided to a WLAN RF chain, 104, which functions in a conventional manner and in which the RF signal is down-converted, filtered, mixed, detected (separated from transmitted signals), converted to a digital signal etc.

Figure 10:
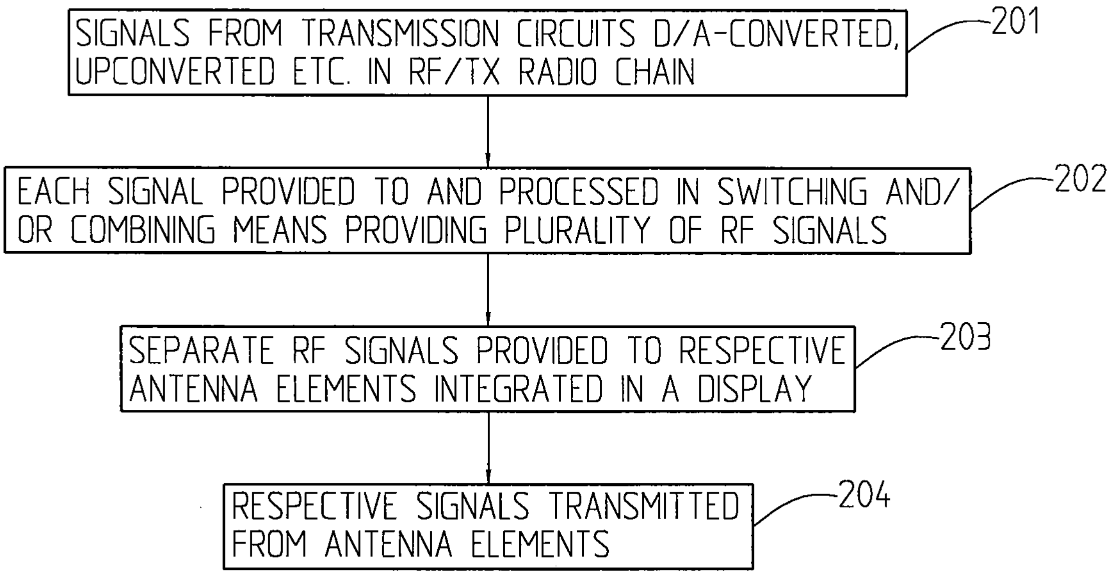
FIG. 10 is a schematical flow diagram describing one way of transmitting radio wave signals from an arrangement according to the invention.

FIG. 10 similarly is a very schematical flow diagram describing the transmitting functionality.

Digital signals are handled in that power is splitted for the respective signals, a D/A conversion step is performed etc., e.g. in a WLAN RF TX chain, 201. It should be clear that the invention is not limited to WLANs (Wireless Local Area Networks), but the concept is of course applicable to any kind of wireless, radio- or millimeter wave or microwave, network.

The signals, now converted to analogue, e.g. RF signals, are handled in the distribution, or switching and/or combining network, 202, and separate signals are provided to individual antenna elements, 203. The individual antenna elements then transmit the respective signals, e.g. with diversity and/or beam-formed, 204.

The inventive concept is applicable with different types of displays or screens.

Two main categories of displays are the LCD and the LED displays. In LCD displays (Liquid Crystal Display) the pixels are merely colored light regulators and the light source is a central source, while in LED (light emitting diode) displays, each pixel is an individual light emitter. There are several different techniques to obtain such displays and a few common examples will be explained below.

LCD screens may comprise Twisted Nematic (TN) displays containing Liquid Crystal (LC) elements which twist and untwist at varying degrees to allow light to pass through. When no voltage is applied to such a TN liquid crystal cell, the light is polarized to pass through the cell. In proportion to the voltage applied, the LC cells twist up to 90 degrees changing the polarization and blocking the path of the light. By changing voltage level, colour and/or transparency can be changed.

Another type of LCD screen is the TFT-LCD screen (Thin Film Transistor). High resolution color displays such as modern LCD computer monitors and televisions use an active matrix structure. A matrix TFT is added to the polarizing and color filters. Each pixel has its own dedicated transistor, allowing each column line to access one pixel. When a row line is activated, all of the column lines are connected to a row of pixels and the correct voltage is supplied to all of the column lines. The row line is then deactivated and the next row line is activated.

A TFT is a special kind of field effect transistor made by depositing thin films for metallic contacts, semiconductor active layer, and dielectric layer. The channel region of a TFT is a thin film that is deposited onto a substrate, often glass since the primary application of TFTs is in liquid crystal displays. Most TFTs are not transparent themselves, but their electrodes and interconnects can be. Today most LCD screens are based on TFTs.

An organic light-emitting diode, OLED, is a special type of LED in which the emissive layer comprises a thin film of certain organic compounds. The emissive electroluminescent layer can include a polymeric substance that allows the deposition of suitable organic compounds, for example, in rows and columns on a flat carrier by using a simple “printing” method to create a matrix of pixels which can emit light of different colors. Such systems can be used in television screens, computer displays, portable system screens, and in advertising and information and indication applications etc.

It should be clear that the invention can be varied in a number of ways, without departing from the scope of the appended claims. It can also be used for other terminal devices and implemented on optical information displaying surfaces in general, windows etc. Also in other aspects the inventive concept is not limited to the specifically illustrated embodiments.

The invention claimed is:

1. A display arrangement, comprising a display means;

an optically transparent and electrically conductive layer structure, adapted to be provided on a first side of said display means, and arranged to form a plurality of receiving and/or transmitting elements, wherein the receiving and/or transmitting elements further comprising an arrangement of antenna elements, and the antenna elements comprise antenna patches;

a grounding conductive layer on a second side of said display means, which is opposite to said first side of said display means on which said receiving and/or transmitting elements are provided, said grounding conductive layer is adapted to act as a ground plane for the antenna patches; and feeding and/or controlling means coupled to the receiving and/or transmitting elements to individually or group-wise feed and/or control said receiving and/or transmitting elements, wherein the feeding means extend along the first side of the display means in a same plane as the antenna elements.

2. The display arrangement according to claim 1, wherein the optically transparent and electrically conductive layer is provided on an optically transparent non-conducting support layer which is disposed on the display means.

3. The display arrangement according to claim 1, wherein the optically transparent electrically conductive layer comprises a thin metallic coating of Au, Ag, Cu or similar or an applied metal oxide coating of $InSnO_2$, a conducting polymer under a thin protective coating, a hard coating with conducting powder of metal, carbon or doped conducting polymer or a doped polymer or carbon nano tubes admixed to a coating at molecular level or vacuum deposited indium tin oxide.

4. The display arrangement according to claim 1, wherein the optically transparent, electrically conductive layer comprises a multilayer structure with a plurality of, or at least two, sub-layers.

5. The display arrangement according to claim 1, wherein the size and/or the shape of the antenna elements is adapted to depend on frequency and/or polarization properties of a communication channel for radio or millimeter waves or microwaves.

6. The display arrangement according to claim 1, wherein the antenna elements comprise separately transmitting and/or receiving element.

7. The display arrangement according to claim 6, wherein the antenna means comprises an array or sub-arrays of antenna elements.

8. The display arrangement according to claim 1, wherein the antenna elements comprise dipole antennas or coplanar antennas in one or more layers or parallel plate antennas and that the feeding means are adapted to feed antenna elements in more than one plane.

9. The display arrangement according to claim 1, wherein the antenna elements via transmission means or feeding means are connected to switching and combining means which are combined with or provided separate from said feeding and/or controlling means and connected to digital control means and by antenna ports to radio- or millimeter wave or microwave signal processing means.

10. The display arrangement according to claim 9, wherein the switching and/or combining means are integrated in a circuit board of the display means provided either in the display or in display computer control means.

11. The display arrangement according to claim 9, wherein the switching and/or combining means comprise a switching or distribution network and/or beam-forming means or spatial multiplexing means.

12. The display arrangement according to claim 1, wherein the antenna elements are arranged to be provided throughout part of or all of the optically transparent electrically conductive structure forming the display means.

13. The display arrangement according to claim 1, wherein the receiving and/or transmitting elements comprise receiving elements adapted to act as a sensor.

14. The display arrangement according to claim 1, wherein the optically transparent, electrically conductive layer further comprises a semi-conducting layer that is transparent for light but conducting for an intended frequency.

15. The display arrangement according to claim 1, wherein the feeding means are incorporated in the optically transparent and electrically conductive layer structure.

16. The display arrangement according to claim 1, wherein the feeding means are electromagnetically coupled to the antenna patches.

17. The display arrangement according to claim 1, wherein the grounding conductive layer is further adapted to act as a ground plane for the display means.

18. A method for receiving and handling multipath radio or millimeter wave or microwave signals in a display arrangement comprising a receiving/transmitting means arranged in association with the display means, the method comprising:

receiving an individual spatially coupled signal in each of a number of receiving elements provided by means of an optically transparent and electrically conductive layer structure disposed on a first side of the display means, wherein the receiving elements comprise an arrangement of antenna elements, the antenna elements comprise antenna patches, and a grounding conductive layer is provided on a second side of said display means, which is opposite to said first side of said display means on which said receiving elements are provided, said grounding conductive layer is adapted to act as a ground plane for the antenna patches, and controlling receiving elements separately or groupwise, for feeding, combining and/or switching the signals received in the receiving elements using feeding means that extend alone the first side of the display means in a same plane as the antenna elements, using the display arrangement both for optical presentation and for reception of radio, millimeter waves or microwaves.

19. A method of handling and transmitting radio or millimeter wave signals or microwaves in an arrangement comprising a display means and a transmitting or receiving and transmitting means, the method comprising:

switching and/or combining and/or multiplexing a number of radio, millimeter or microwave signals in a feeding, combining and/or switching distribution network associated with or in the display means, providing separate radio, millimeter or microwave signals to transmitting elements provided by means of an optically transparent, electrically conductive structure provided on a first side of the display means such that the display means can be used both for optical presentation and for radio, millimeter or microwave transmission, wherein the transmitting elements comprise an arrangement of antenna elements, the antenna elements comprise antenna patches, the feeding distribution network extends along the first side of the display means in a same plane as the antenna elements, and a grounding conductive layer is provided on a second side of said display means, which is opposite to said first side of said display means on which said transmitting elements are provided, said grounding conductive layer is adapted to act as a ground plane for the antenna patches.

* * * * *

UNITED STATES PATENT AND TRADEMARK OFFICE
CERTIFICATE OF CORRECTION

PATENT NO. : 8,543,167 B2
APPLICATION NO. : 12/746308
DATED : September 24, 2013
INVENTOR(S) : Harrysson et al.

It is certified that error appears in the above-identified patent and that said Letters Patent is hereby corrected as shown below:

In the Drawings

In Fig. 9, Sheet 4 of 4, for Tag “103”, in Line 2, delete “COBINING” and insert -- COMBINING --, therefor.

In the Claims

In Column 8, Line 20, in Claim 1, delete “comprising” and insert -- comprising: --, therefor.

In Column 10, Line 14, in Claim 18, delete “alone” and insert -- along --, therefor.

Signed and Sealed this
Fifteenth Day of April, 2014

Michelle K. Lee

Michelle K. Lee
*Deputy Director of the United States Patent and Trademark Office*